(12) United States Patent
Dooley

(10) Patent No.: US 8,169,100 B2
(45) Date of Patent: May 1, 2012

(54) TORQUE TRANSMISSION FOR AN AIRCRAFT ENGINE

(75) Inventor: Kevin Allan Dooley, Mississauga (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 534 days.

(21) Appl. No.: 12/022,236

(22) Filed: Jan. 30, 2008

(65) Prior Publication Data
US 2009/0322088 A1 Dec. 31, 2009

(51) Int. Cl.
*F02N 11/04* (2006.01)
*H02K 23/52* (2006.01)
*H02P 9/04* (2006.01)

(52) U.S. Cl. .................. 290/46; 290/31; 123/198 R

(58) Field of Classification Search .............. 290/31, 290/46; 123/198 R
See application file for complete search history.

(56) References Cited

U.S. PATENT DOCUMENTS

| | | | |
|---|---|---|---|
| 3,786,696 A | 1/1974 | Aleem | 475/77 |
| 4,310,768 A | 1/1982 | Colley | 290/1 C |
| 4,572,961 A | 2/1986 | Borger | 290/4 R |
| 4,708,030 A * | 11/1987 | Cordner | 475/296 |
| 4,733,155 A | 3/1988 | Smith | 322/10 |
| 4,914,906 A | 4/1990 | Burch | 60/788 |
| 5,028,803 A * | 7/1991 | Reynolds | 290/31 |
| 5,030,877 A | 7/1991 | Denk | 290/52 |
| 5,267,433 A | 12/1993 | Burch | 60/788 |
| 5,309,708 A | 5/1994 | Stewart, Jr. et al. | 60/787 |
| 5,418,400 A * | 5/1995 | Stockton | 290/46 |
| 5,555,722 A | 9/1996 | Mehr-Ayin et al. | 60/788 |
| 5,694,765 A | 12/1997 | Hield et al. | 60/39.163 |
| 5,867,979 A | 2/1999 | Newton et al. | 60/226.1 |
| 6,371,877 B1 * | 4/2002 | Schroeder et al. | 475/5 |
| 6,467,725 B1 | 10/2002 | Coles et al. | 244/58 |
| 6,631,703 B2 * | 10/2003 | Tonnqvist et al. | 123/198 R |
| 6,677,685 B2 | 1/2004 | Pfleger et al. | 290/40 C |
| 6,695,082 B2 * | 2/2004 | Bitsche et al. | 180/65.25 |
| 6,825,640 B1 | 11/2004 | Hill et al. | 322/46 |
| 6,838,778 B1 * | 1/2005 | Kandil et al. | 290/31 |
| 6,838,779 B1 * | 1/2005 | Kandil et al. | 290/31 |
| 6,871,128 B2 | 3/2005 | Kuonon et al. | 701/51 |
| 7,028,461 B2 | 4/2006 | Goi | 60/39.22 |
| 7,105,937 B2 | 9/2006 | Hoppe et al. | 290/38 R |
| 7,185,496 B2 * | 3/2007 | Herlihy | 60/774 |
| 7,250,688 B2 * | 7/2007 | Thomson et al. | 290/34 |
| 7,353,895 B2 * | 4/2008 | Bitsche et al. | 180/65.25 |
| 7,405,542 B1 * | 7/2008 | McAvoy | 322/14 |
| 7,434,406 B2 * | 10/2008 | Herlihy et al. | 60/788 |
| 7,481,062 B2 | 1/2009 | Gaines et al. | 60/792 |
| 7,575,192 B1 * | 8/2009 | Kish | 244/60 |
| 7,892,129 B2 * | 2/2011 | Lee | 475/16 |
| 7,913,581 B2 * | 3/2011 | Jackson | 74/330 |
| 7,915,869 B2 * | 3/2011 | Xu et al. | 322/59 |
| 7,927,249 B2 * | 4/2011 | Phillips et al. | 475/323 |
| 7,967,715 B2 * | 6/2011 | Hart et al. | 475/282 |

(Continued)

FOREIGN PATENT DOCUMENTS

EP 0104921 A2 4/1984

(Continued)

*Primary Examiner* — Pedro J Cuevas
(74) *Attorney, Agent, or Firm* — Norton Rose Canada LLP

(57) ABSTRACT

The torque transmission system for an aircraft engine permits a starter-generator to drive the engine on starting at a speed reducing ratio. Once the engine is running, the engine then drives the starter-generator also at a speed reducing ratio.

6 Claims, 3 Drawing Sheets

U.S. PATENT DOCUMENTS

| | | | |
|---|---|---|---|
| 8,013,488 B2 * | 9/2011 | Berenger et al. | 310/113 |
| 2002/0117860 A1 * | 8/2002 | Man et al. | 290/46 |
| 2003/0116118 A1 * | 6/2003 | Tonnqvist et al. | 123/198 R |
| 2004/0006994 A1 | 1/2004 | Walsh et al. | 60/792 |
| 2004/0098988 A1 | 5/2004 | Goi | 60/772 |
| 2004/0255590 A1 * | 12/2004 | Rago et al. | 60/772 |
| 2006/0012177 A1 * | 1/2006 | Hoppe | 290/1 A |
| 2006/0012179 A1 * | 1/2006 | Thomson et al. | 290/34 |
| 2006/0012180 A1 | 1/2006 | Hoppe et al. | 290/38 R |
| 2006/0042252 A1 | 3/2006 | Derouineau | 60/703 |
| 2006/0138779 A1 | 6/2006 | Bouiller et al. | 290/52 |
| 2006/0249956 A9 * | 11/2006 | Thomson et al. | 290/34 |
| 2006/0254253 A1 * | 11/2006 | Herlihy et al. | 60/39.162 |
| 2007/0151258 A1 | 7/2007 | Gaines et al. | 60/792 |
| 2007/0265761 A1 | 11/2007 | Dooley et al. | 701/100 |
| 2009/0309461 A1 * | 12/2009 | Berenger et al. | 310/67 R |
| 2011/0021308 A1 * | 1/2011 | Phillips et al. | 475/296 |
| 2011/0034294 A1 * | 2/2011 | Phillips et al. | 475/296 |
| 2011/0101693 A1 * | 5/2011 | Goi et al. | 290/46 |
| 2011/0162483 A1 * | 7/2011 | Jackson | 74/665 A |
| 2011/0281679 A1 * | 11/2011 | Larrabee et al. | 475/5 |

FOREIGN PATENT DOCUMENTS

| | | |
|---|---|---|
| EP | 1031717 A2 | 8/2000 |
| EP | 1106870 B1 | 6/2001 |
| EP | 1031717 A3 | 8/2002 |
| EP | 1251294 A2 | 10/2002 |
| EP | 1359299 B1 | 11/2003 |
| EP | 1251294 A3 | 3/2006 |
| EP | 1764908 A1 | 3/2007 |
| EP | 2085590 A2 * | 8/2009 |
| GB | 2220038 | 12/1989 |
| GB | 2402450 | 12/2004 |
| WO | WO88/01689 | 3/1988 |
| WO | WO2005021949 A2 | 3/2005 |
| WO | WO2005054645 A1 | 6/2005 |
| WO | WO2006084437 | 8/2006 |
| WO | WO2007096493 | 8/2007 |

* cited by examiner

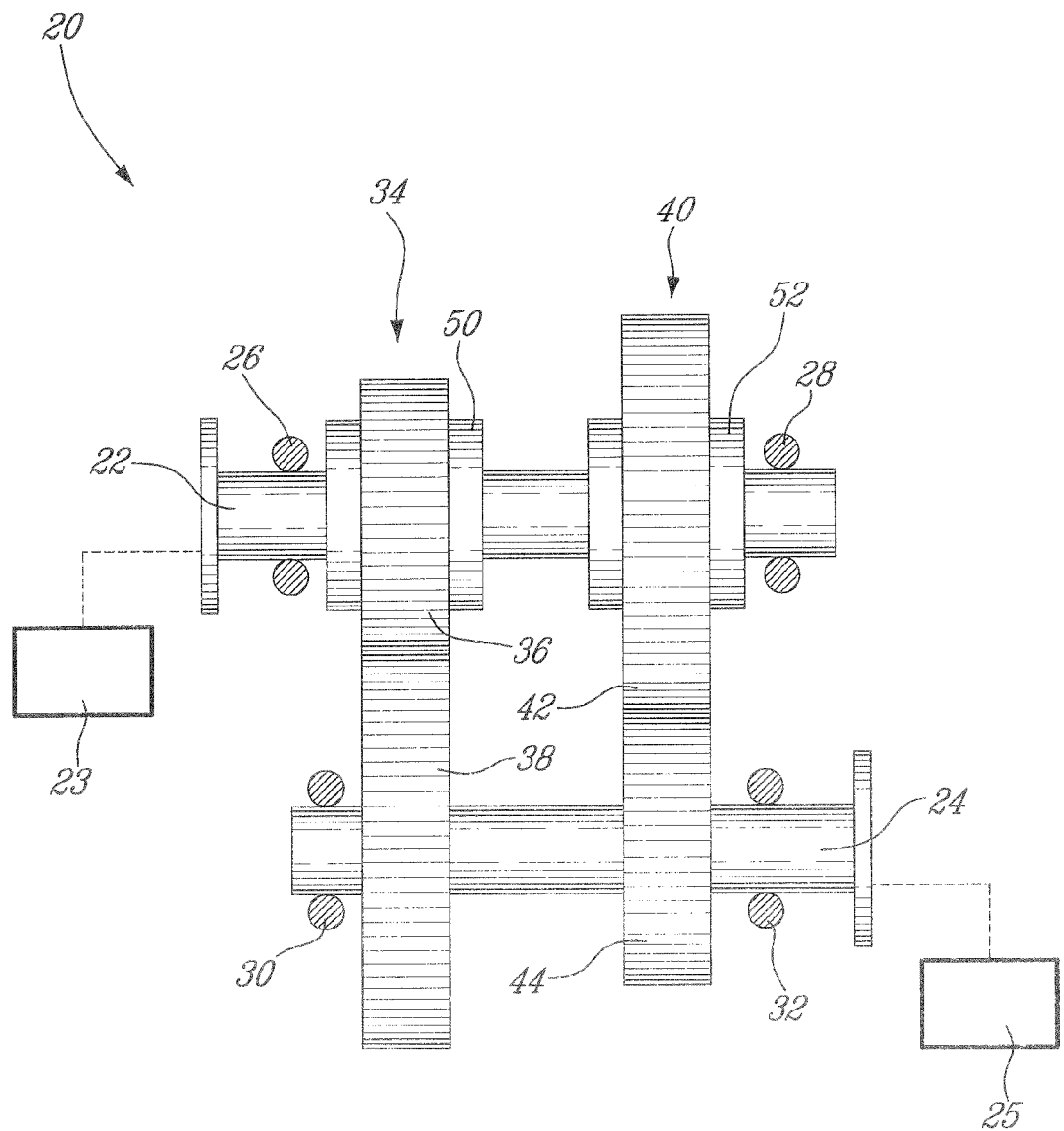

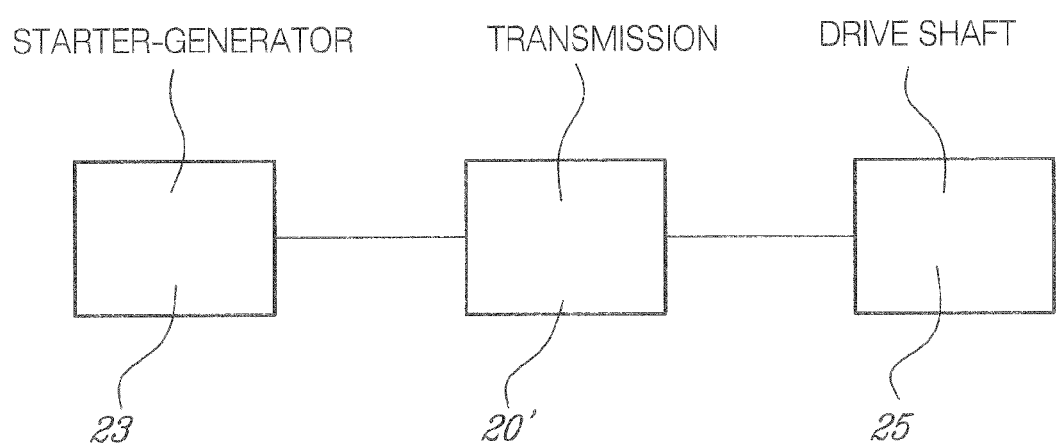

TORQUE TRANSMISSION FOR AN AIRCRAFT ENGINE

TECHNICAL FIELD

The field of invention generally relates to a torque transmission arrangement and to a method of providing a speed reduction between a starter-generator and an aircraft engine.

BACKGROUND OF THE ART

When starting an aircraft engine such as a gas turbine engine, it is desirable to use an electric starter operating at the highest optimum speed since the starter motor can then have a smaller and a lighter construction compared to a motor operating at a lower rotation speed. However, when the engine is running, the operating speed of the engine can be many times the starting speed and a smaller-sized starter may need to be disconnected from the engine to prevent it from overspeeding. If the electrical machine remains continuously connected to the engine spool shaft, concessions in machine design need to be made in order to allow a sufficiently robust machine to operate in both starting and generating conditions, which results in associated weight penalties. Room for improvement thus exists.

SUMMARY

In one aspect, the present concept provides an aircraft engine comprising a starter-generator drivingly connected to a drive shaft through a transmission, the transmission having a first speed reducing transmission ratio when driven by the starter-generator and having a second speed reducing transmission ratio when driven by the drive shaft.

In another aspect, the present concept provides a bi-directional torque transmission system for use in an aircraft engine, the system comprising: a first input/output shaft; a second input/output shaft; a first set of continuously-meshed gears interposed between the first and the second input/output shaft; a second set of continuously-meshed gears interposed between the first and the second input/output shaft; a first one-way clutch associated with the first gear set, the first one-way clutch drivingly connecting together the first input/output shaft, the first gear set and the second input/output shaft upon transfer of a torque from the first input/output shaft to the second input/output shaft; and a second one-way clutch associated with the second gear set, the second one-way clutch drivingly connecting together the second input/output shaft, the second gear set and the first input/output shaft upon transfer of a torque from the second input/output shaft to the first input/output shaft.

In a further aspect, the present concept provides a system for transferring torque in a gas turbine engine between a starter-generator and an engine spool shaft between which the system is connected, the system comprising a first speed-reduction transmission mode in which torque is transmitted from the starter-generator to the engine spool shaft, and a second speed-reduction torque transmission mode in which torque is transmitted from the engine spool shaft to the starter-generator.

In a further aspect, the present concept provides a method of providing a constant speed reduction between two rotating parts in an aircraft engine, the method comprising: generating a starting torque during engine start and automatically creating a first unidirectional torque-transmission engagement between the two parts; once the engine runs on its own, interrupting the starting torque and automatically disengaging the first unidirectional torque-transmission engagement; and generating a driving torque with the running engine and automatically creating a second unidirectional torque-transmission engagement by which at least some of the driving torque is transmitted between the two parts in a direction opposite that of the starting torque.

Further details of these and other aspects will be apparent from the detailed description and figures included below.

DESCRIPTION OF THE FIGURES

Reference is now made to the accompanying figures, in which:

FIG. 2 is a schematic cross-sectional view of an example of a torque transmission device as improved; and FIG. 3 is a block diagram showing a torque-transmission system in which the transmission ratio is variable.

DETAILED DESCRIPTION OF THE PREFERRED EMBODIMENTS

Figure 1:
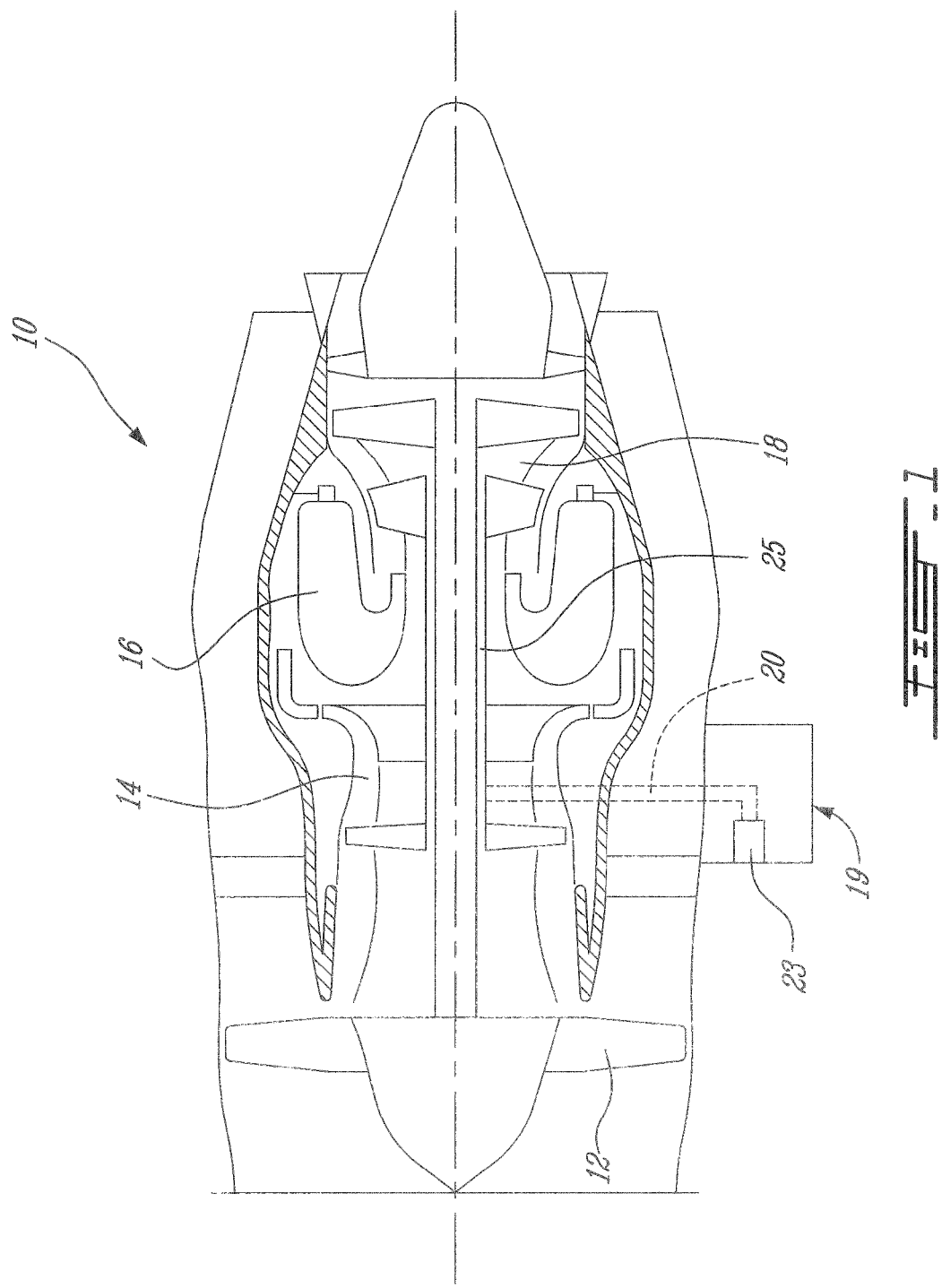
FIG. 1 schematically shows a generic gas turbine engine to illustrate an example of a general environment in which the improved torque-transmission system and method can be used.

FIG. 1 illustrates an example of a gas turbine engine 10 generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. A high pressure compressor-turbine shaft 25 is connected by a transmission 20 (presented rather schematically in FIG. 1) to an electric starter-generator 23, located in this example on an accessory gearbox 19. This figure only illustrates one example of a suitable environment in which the present system and method may be used.

FIG. 2 shows an example of a torque transmission system 20 as improved. This system 20 is designed to be used in the gas turbine engine 10. It comprises a first input/output shaft 22 and a second input/output shaft 24. Both shafts 22, 24 are parallel and juxtaposed in this example, other configurations being also possible. Each shaft 22, 24 is supported by a corresponding set of bearings 26, 28, 30, 32. The first input/output shaft 22 can be connected to the starter-generator 23 of the engine, while the second input/output shaft 24 can be connected to a drive shaft, for instance the engine spool shaft 25. These connections can be direct or indirect, using for instance including a tower shaft or other kinds of mechanical links to carry the rotational movement.

The illustrated system 20 comprises a first set 34 of continuously-meshed gears interposed between the first and the second input/output shaft 22, 24. This first gear set 34 has two gears 36, 38 of different diameters. The smaller one is coaxially mounted around the first input/output shaft 22 and the larger one is coaxially mounted around the second input/output shaft 24. It also comprises a second set 40 of continuously-meshed gears interposed between the first and the second input/output shaft 22, 24. This second gear set 40 has two gears 42, 44 of different diameters. The smallest one is coaxially mounted around the second input/output shaft 24 and the larger one is coaxially mounted around the first input/output shaft 22.

A first one-way clutch 50, associated with the first gear set 34, is provided for drivingly connecting together the first input/output shaft 22, the first gear set 34 and the second input/output shaft 24 upon transfer of a torque from the first input/output shaft 22 toward the second input/output shaft 24. A second one-way clutch 52, associated with the second gear set 40, is provided for drivingly connecting together the second input/output shaft 24, the second gear set 40 and the first input/output shaft 22 upon transfer of a torque from the second input/output shaft 24 toward the first input/output shaft 22. Thus, one of the one-way clutches 50, 52 works in the clockwise direction and the other works in the counter-clockwise direction. One-way clutches 50, 52 are activated by a torque provided in one direction from the input side to the output side thereof. They offer no or very little resistance in the opposite direction.

The first one-way clutch 50 and the second one-way clutch 52 can each include a sprag. In the illustrated example, the sprag clutch 50 associated with the first gear set 34 is coaxially mounted between the first gear 36 and the first input/output shaft 22. Likewise, the sprag clutch 52 associated with the second gear set 40 is coaxially mounted between the second gear 42 and the first input/output shaft 22. Mounting one of the sprag clutches 50, 52 or even both of them on the second input/output shaft 24 would have also been possible.

As can be appreciated, the system 20 provides a bi-directionally transmission of the torque between the starter-generator 23 to which the first input/output shaft 22 of the system 20 is mechanically connected, and the drive shaft 25 to which the second input/output shaft 27 of the system 20 is mechanically connected. Thus, the system 20 has a first transmission mode in which torque is transmitted at a constant first speed reducing ratio from the first input/output shaft 22 to the second input/output shaft 24, and a second torque transmission mode in which torque is transmitted at a constant second speed reducing ratio from the second input/output shaft 24 to the first input/output shaft 22. Torque is transmitted in the first transmission mode using the first one-way clutch 50 and the second transmission mode uses the second one-way clutch 52 to transmit the torque in the other direction. The first and the second speed reducing ratio may be equal or different, depending on the needs. However, using this system 20, a speed reducing ratio is provided in both directions. With the speed reducing ratio, the input shaft rotates faster than the output shaft and the torque at the output shaft is proportionally increased.

In use, electrical power is sent to the starter-generator 23 during engine start. The starter-generator 23 then generates a starting torque. This automatically creates a first unidirectional torque-transmission engagement between the starter-generator 23 and the drive shaft 25 because of the first one-way clutch 50. The second one-way clutch 52 is inactive since it is opposite the first one. Once the engine runs on its own, the electrical power to the starter-generator 23 can be interrupted. This automatically disengages the first unidirectional torque-transmission engagement. As the engine runs faster, it generates torque and at least a portion of the torque generated by the engine at the shaft 25 is sent to the starter-generator 23, thereby automatically creating a second unidirectional torque-transmission engagement between the shaft 25 and the starter-generator 23. Rotational direction of the parts remains the same at all times.

Overall, the present system and method allow the starter-generator to be designed to rotate at a high rotation speed when providing a starting torque while not overrunning when receiving a driving torque from the running engine to generate electrical power.

The above description is meant to be exemplary only, and one skilled in the art will recognize that certain changes may be made to the embodiments described without departing from the scope of the appended claims. For example, the system and the method are not limited for use with a turbofan engine, and may be used with any suitable engine such as other gas turbine engines and even piston engines. The starter-generator may be located in the AGB as described, or mounted concentrically with an engine spool shaft, or provided in any other suitable configuration. The concept is not strictly limited to use with electric starter-generators, and any suitable starter-generator device(s) may be used. In some applications, the stator-generator can be substituted by a non-electrical device, such as a pneumatic or hydraulic. Any suitable transmission may provided, and the above-described example is merely one of a variety of possibilities available, as will be apparent to those skilled in the art. The transmission need not be mechanical, and may be hydraulic, pneumatic, magnetic, or any suitable transmission. The speed-reduction ratios of the transmission need not be constant, and a continuously variable transmission (CVT) (see 20' in FIG. 3) or other suitable variable transmission may be used. The described transmission is also subject to modification. For example, each set of gears can have more than two gears. The first and the second set of gears can have a different number of gears. The sprag clutch is only one of the possible kinds of one-way clutches and other kinds of one-way clutches can be used as well. The first one-way clutch and the second one-way clutch do not need to be identical. As aforesaid, mounting one of the one-way clutches or even both of them on the second input/output shaft instead of the first input/output shaft is possible. Yet, using more than two one-way clutches in the same gear set is possible. The input/output shafts can be coaxial. The gear arrangement could then be configured as an epicyclical gear arrangement, for instance. The expression "drive shaft" must be construed in a broad sense. The link between the system and the starter-generator and the shaft can be direct or indirect. For instance, the drive shaft and the system can be mechanically connected together using a tower shaft and a plurality of external gears. Still other modifications which fall within the spirit of the present invention will be apparent to those skilled in the art, in light of a review of this disclosure, and such modifications are intended to fall within the scope of the appended claims.

What is claimed is:

1. An aircraft engine comprising a starter-generator drivingly connected to a drive shaft through a transmission, the transmission having a first speed reducing transmission ratio when driven by the starter-generator and having a second speed reducing transmission ratio when driven by the drive shaft; the starter-generator being drivingly connected to the drive shaft at the first ratio through a first unidirectional clutch and the drive shaft being drivingly connected to the starter-generator at the second ratio through a second unidirectional clutch; wherein at least one of the first ratio and the second ratio is constant at all rotation speeds.

2. The engine as defined in claim 1, wherein the transmission includes a first set of meshed gears corresponding to the first ratio, and a second set of meshed gears corresponding to the second ratio.

3. The engine as defined in claim 2, wherein each of the first and second clutches includes a sprag.

4. The engine as defined in claim 1, wherein the first ratio is less than the second ratio, such that the second ratio reduces an output speed of the transmission more than the first ratio.

5. The engine as defined in claim 2, wherein the other of the first ratio and the second ratio is variable.

6. The engine as defined in claim 1, wherein the first ratio and the second ratio are each constant at all rotation speeds.

* * * * *